G. W. McKEE.
METAL MELTING HYDROCARBON BURNING FURNACE.
APPLICATION FILED JAN. 31, 1908.
940,710.
Patented Nov. 23, 1909.
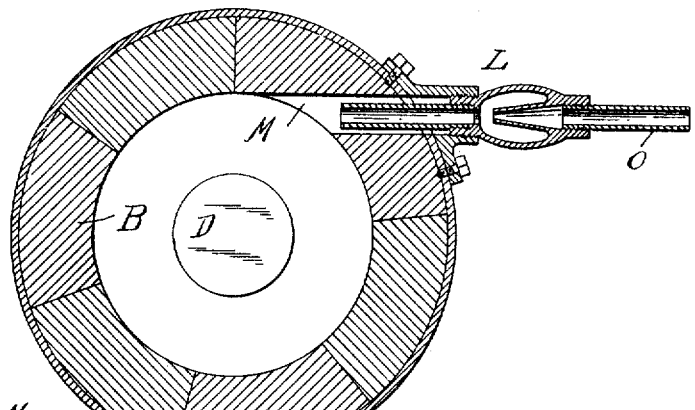
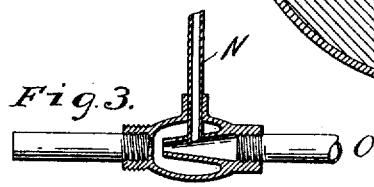
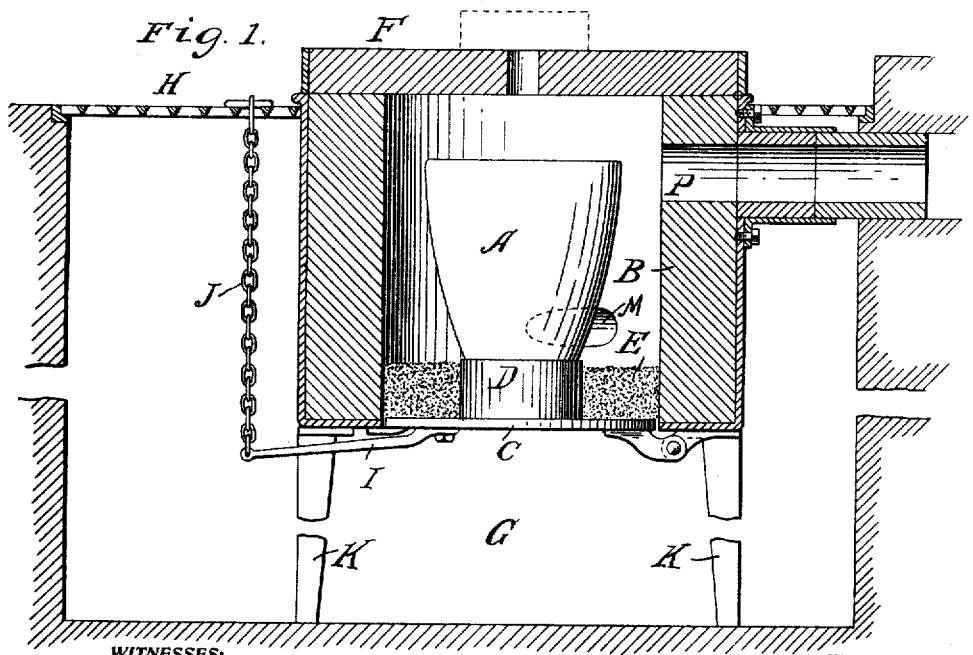
WITNESSES:
Walter A. Greenburg
A. M. Dow
INVENTOR
Garnet W. McKee
BY
ATTORNEYS

UNITED STATES PATENT OFFICE.

GARNET W. McKEE, OF CHICAGO, ILLINOIS.

METAL-MELTING HYDROCARBON-BURNING FURNACE.

940,710.  Specification of Letters Patent.  Patented Nov. 23, 1909.

Application filed January 31, 1908. Serial No. 413,520.

*To all whom it may concern:*

Be it known that I, GARNET W. McKEE, a subject of King Edward VII of Great Britain, residing at Chicago, in the county of Cook and State of Illinois, have invented certain new and useful Improvements in Metal-Melting Hydrocarbon-Burning Furnaces, of which the following is a specification, reference being had therein to the accompanying drawings.

This invention relates more specifically to crucible furnaces especially designed for melting brass or other metals and the invention consists in the novel construction and arrangement of the furnace whereby in case the crucible breaks or the metal is spilled in any manner, the same may be readily recovered, all as more fully hereinafter described and shown in the accompanying drawings, in which—

Figure 1, a vertical section through the furnace; Fig. 2, is a horizontal section substantially in the plane of the burner, and Fig. 3, is a vertical section through the burner.

As indicated by letters of reference in the drawings A is a crucible, B is a cylindrically formed furnace chamber having the usual fire brick lining.

C is a hinged trap door forming the bottom of the furnace chamber.

D is a centrally disposed crucible stand of less diameter than the furnace chamber and supporting the crucible above the bottom thereof.

E is a filling of sand around the crucible stand, preferably coarse silica.

F is a cover preferably of fire brick and provided with any known means (not shown) for lifting it on and off.

G is a pit in which the furnace is supported and forms an open area beneath and around the furnace.

H is a removable grating providing access to the space beneath the furnace.

I is an arm on the trap door.

J is a chain for holding the arm in position when the trap door is closed.

K are the legs of the furnace supporting it above the floor of the pit.

L is a hydro-carbon injector burner.

M an opening in the furnace wall in which the burner is supported tangentially to the inner wall of the furnace.

N is the hydro-carbon supply pipe for the burner.

O is the air supply pipe of the burner and P the exit into the chimney for the products of combustion.

The parts being arranged as shown and described, it will be understood that the flame from the burner passes with a circular motion around the crucible till it arrives at the top where the exit flue is located, thus expending its heat very uniformly upon all sides of the crucible and in case the crucible breaks or metal is in any way spilled, the same can be readily recovered by dropping the trap door which lets the sand run out leaving the metal in a chunk, and the furnace can be immediately put into operative condition again without loss of time.

What I claim as my invention is:—

1. A metal-melting furnace comprising the combination with a masonry-lined pit of a cylindrical furnace chamber therein, legs supporting the chamber with its upper end substantially flush with the top of the pit lining, a trap door closing the lower end of the chamber, an arm extending therefrom, a grating over the pit, a chain attached to the arm adapted to detachably engage the grating as a support for the arm of the door, a crucible stand of less diameter than the chamber standing on the trap door, a filling of loose sand on the door in the annular space around the stand, and means for directing a blast flame around a crucible on the stand, near its bottom.

2. A metal melting furnace comprising the combination with a masonry-lined-pit of a cylindrical furnace chamber therein, legs supporting the chamber with its upper end substantially flush with the top of the pit lining, a trap door closing the lower end of the chamber, an arm extending therefrom, a grating over the pit, a chain attached to the arm adapted to detachably engage the grating as a support for the arm and door, a crucible stand of less diameter than the chamber standing on the trap door, a filling of loose sand on the door in the annular space around the stand, the pit lining having a tangentially disposed opening for a burner near the top of the crucible stand, and a pipe extending radially from the upper part of the chamber into a flue opening in the pit lining.

3. A metal-melting furnace comprising the combination with a masonry-lined pit of a cylindrical furnace chamber therein, legs supporting the chamber with its upper end substantially flush with the top of the pit lining, a trap door closing the lower end of the chamber, an arm extending therefrom, a grating over the pit, a chain attached to the arm adapted to detachably engage the grating as a support for the arm and door, a crucible stand of less diameter than the chamber standing on the trap door, a filling of loose sand on the door in the annular space around the stand, the pit lining having a tangentially disposed opening for a burner near the top of the crucible stand, a hydrocarbon blast burner in the tangential opening, and a pipe extending radially from the upper part of the chamber into a flue opening in the pit lining.

In testimony whereof I affix my signature in presence of two witnesses.

GARNET W. McKEE.

Witnesses:
 ROBT. W. LARKE,
 H. H. McLEAN.